US006930731B2

(12) United States Patent
Hirota et al.

(10) Patent No.: US 6,930,731 B2
(45) Date of Patent: Aug. 16, 2005

(54) VIDEO APPLIANCE, HOLDING DEVICE, AND MANUFACTURING METHOD OF HOLDING DEVICE

(75) Inventors: Narumi Hirota, Ibaraki (JP); Yuichi Matsuoka, Takatsuki (JP); Yasuji Yamato, Neyagawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 629 days.

(21) Appl. No.: 09/936,915

(22) PCT Filed: Jan. 26, 2001

(86) PCT No.: PCT/JP01/00518

§ 371 (c)(1),
(2), (4) Date: Nov. 15, 2001

(87) PCT Pub. No.: WO01/58152

PCT Pub. Date: Aug. 9, 2001

(65) Prior Publication Data

US 2002/0158839 A1 Oct. 31, 2002

(30) Foreign Application Priority Data

Jan. 31, 2000 (JP) .......................... 2000-021628

(51) Int. Cl.[7] .......................... H04N 5/65; H04N 5/645
(52) U.S. Cl. ................... 348/825; 269/903; 269/908; 269/909; 313/477 R
(58) Field of Search .................. 348/825; 269/903, 269/908–909; 313/477 R; H04N 5/65, 5/645

(56) References Cited

U.S. PATENT DOCUMENTS

| 4,306,253 A | * | 12/1981 | Nakamura ................... 348/825 |
| 4,593,227 A | * | 6/1986 | Bruce et al. ................. 313/482 |
| 5,383,948 A | * | 1/1995 | Muir ............................. 65/28 |
| 5,416,595 A | * | 5/1995 | Wield .......................... 348/825 |
| 5,606,377 A | * | 2/1997 | Swank ........................ 348/821 |
| 5,688,328 A | * | 11/1997 | Tong et al. .................. 118/505 |
| 5,789,873 A | * | 8/1998 | Jeong .......................... 315/370 |
| 5,949,500 A | * | 9/1999 | Yang ........................... 348/825 |
| 6,055,026 A | * | 4/2000 | Wada ........................... 348/820 |
| 6,204,894 B1 | * | 3/2001 | Manson ....................... 348/821 |
| 6,338,462 B1 | * | 1/2002 | Harper et al. ............... 248/302 |

FOREIGN PATENT DOCUMENTS

| JP | 53-119823 | 9/1978 |
| JP | 62-085592 | 4/1987 |
| JP | 05-284513 | 10/1993 |
| JP | 10-56647 | 2/1998 |
| JP | 10-042227 | 2/1998 |
| JP | 10-336552 | 12/1998 |

* cited by examiner

*Primary Examiner*—Brian Yenke
(74) *Attorney, Agent, or Firm*—Steptoe & Johnson LLP (57) ABSTRACT

A cathode-ray tube (CRT) holding device holds a CRT from the rear side by a rib section having a shape similar to that of a funnel of the CRT and extending in plural directions. The rib section has a section having shaped in a recessed groove, and a degaussing coil is disposed in the groove. The CRT holding device has a low cost and a raised recycling rate. Without increasing the number of parts, the degaussing coil can be mounted.

15 Claims, 11 Drawing Sheets

Fig. 11

VIDEO APPLIANCE, HOLDING DEVICE, AND MANUFACTURING METHOD OF HOLDING DEVICE

DESCRIPTION

Video appliance, holding device, and manufacturing method of holding device

TECHNICAL FIELD

The present invention relates to a holding device for a display panel such as cathode-ray tube (CRT), and a video appliance incorporating the CRT.

BACKGROUND ART

In a video appliance, for example, a television receiver and display monitor, an injection molding of metal members to form a case for holding or accommodating a display panel has been proposed to enhance a recycling rate. For example, Japanese Laid-open Patent No. 10-42227 discloses a case formed by the injection molding of metal members made of magnesium alloy or the like. Japanese Laid-open Patent No. 10-336552 proposes an injection molding of a case for a large-sized video appliance with a molding machine having a small clamping force.

Regarding a mounting of a degaussing coil on the CRT, Japanese Laid-open Patent No. 62-85592 and Japanese Laid-open Patent No. 5-284513 discloses, for example, a degaussing coil holding member aside from the holding device (case) for holding the CRT.

As the display panel of the video appliance, aside from the CRT, a plasma display panel and liquid crystal panel are used widely.

Such a conventional case for the video appliances has the following problems.

1) Generally, the case for the video appliance such as television receiver is composed of two members, that is, a front cover (front case) for mounting the display panel such as CRT, and a rear cover (rear case) for covering the rear part of the display panel. The rear cover is shaped like a container, and as the video appliance becomes larger, the projection area of the rear cover becomes wider. For an injection molding of the rear cover, therefore, a molding machine having a large clamping force is required.

2) In the case disclosed in Japanese Laid-open Patent No. 10-336552, the distance form a runner section to a sprue section for pouring metal member to the final product shaping section is long. The sprue section and runner section are finally removed from the product and are unnecessary portions. If the sprue section and runner section are long, the case has a large material loss.

3) When holding a large and heavy display panel, for example, a CRT of 36-inch, the case requires a corresponding rigidity and has a wall thickness which cannot be reduced.

4) When the holding device (front case) for holding the display panel, such as CRT, and the member for mounting the degaussing coil are separate parts, the number of parts and the number of mounting steps increases and raising a cost.

SUMMARY OF THE INVENTION

A video appliance and display panel holding device have a rib section corresponding (similar) to a funnel shape of a display panel, for example, cathode-ray tube (CRT), and holds the CRT from the rear side. More specifically, 1) The CRT is supported from the rear side by the rib section corresponding (similar) to the funnel shape, and extending at least in plural directions.

2) The rib section and a support base are formed unitarily, and support the CRT in self-standing manner.

3) The sectional shape of the rib section is like a gutter, and the degaussing coil is disposed in a groove of the gutter.

4) The rib section is formed by an injection molding of one of magnesium alloy, aluminum alloy, and zinc alloy.

5) Apart of the rib section is a runner section for pouring an injection material into the final product for the injection molding.

The weight of the heavy display panel such as CRT is supported by the rib section. As having a reduced weight, the front panel attached to the screen side of the CRT and the cover for covering a control circuit have a reduced material cost. Of course, the television receiver has an the excellent appearance design, and satisfies safety standards.

Further, the rib section is formed of metal member, and the front panel and cover are formed of metal member such as steel plate. Therefore, the video appliance can be recycled safely without producing a harmful substance, and has an enhanced recycling rate. As a result, it contributes to conservation of environments.

The frame and support base unitarily formed with the rib section hold the CRT in self-standing manner can be manufactured by a conventional manufacturing process of holding the CRT in self-standing manner with a front cabinet. The conventional process does not need to be modified so much.

The rib section having the groove of the gutter is more rigid than a flat plate shape, and has a reduced wall thickness. And the rib section has a low material cost.

Moreover, as the degaussing coil in the groove, the rib section can hold the coil without other parts than the holding device for holding the CRT. Hence, the number of parts and the number of mounting steps decreases.

A part of the rib section is formed as the runner section for pouring the injection material from the injection molding machine into the final product in good balance, the frame has a reduced material loss and reduced cost.

DESCRIPTION OF THE PREFERRED EMBODIMENT

In the following embodiments of the invention, a television receiver using a cathode-ray tube (CRT) is explained as a video appliance.

(Embodiment 1)

Figure 1:
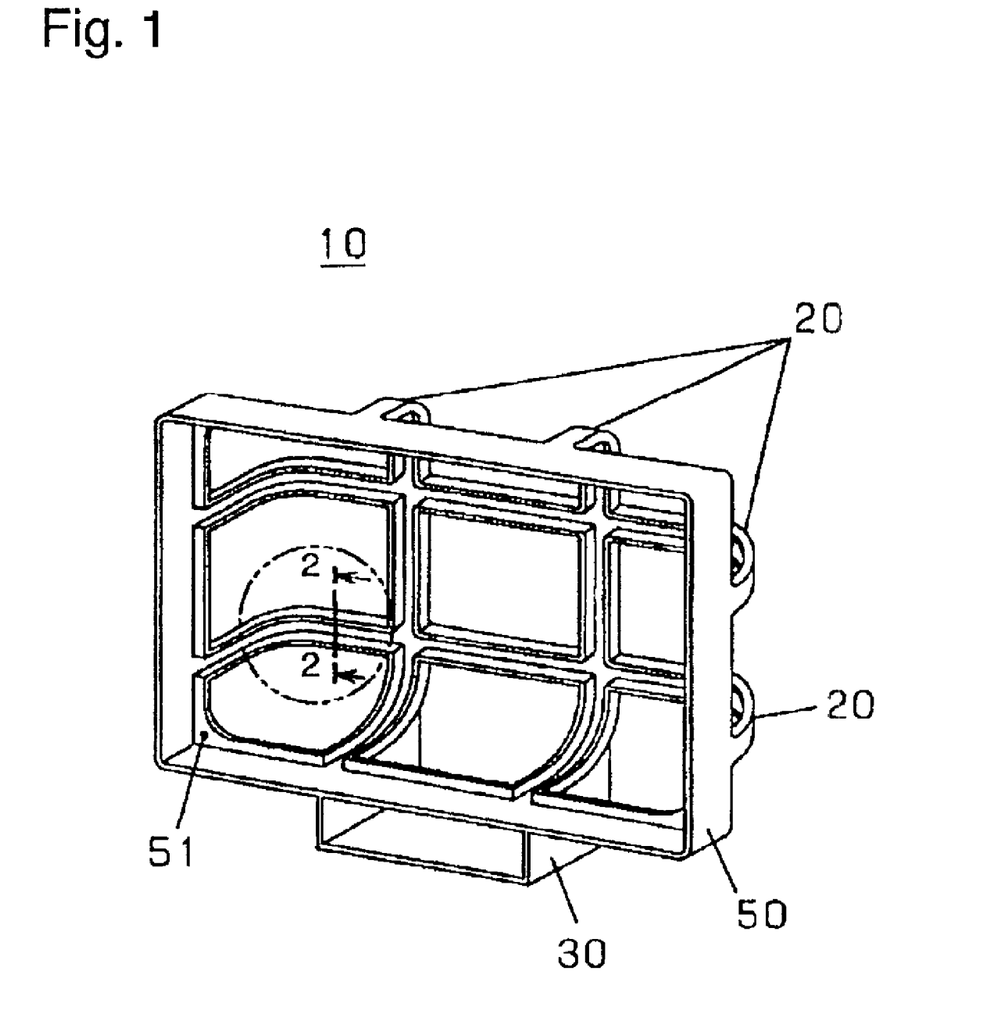
FIG. 1 is a perspective outline view of a CRT holding device according to embodiment 1 of the present invention.
Figure 2:
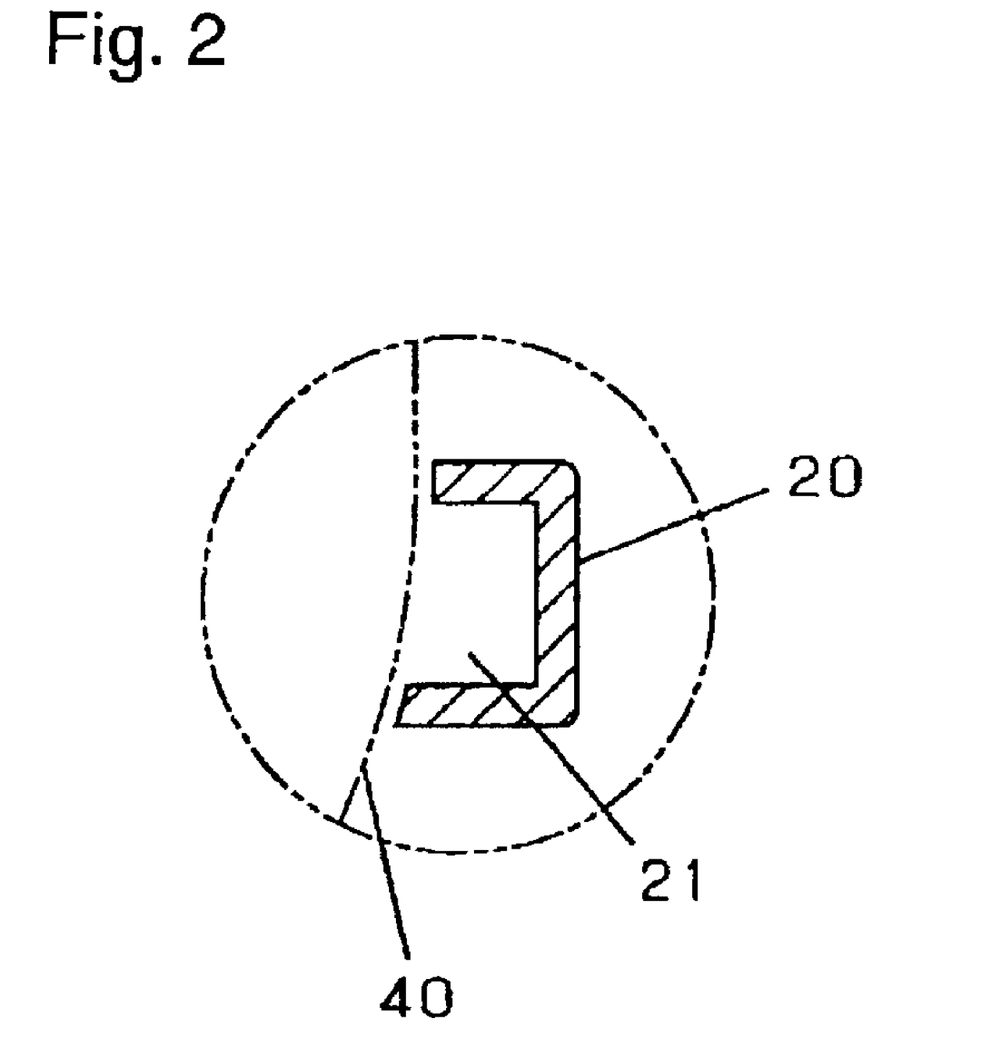
FIG. 2 is a sectional view along a cut line 2—2 in FIG. 1.
Figure 11:
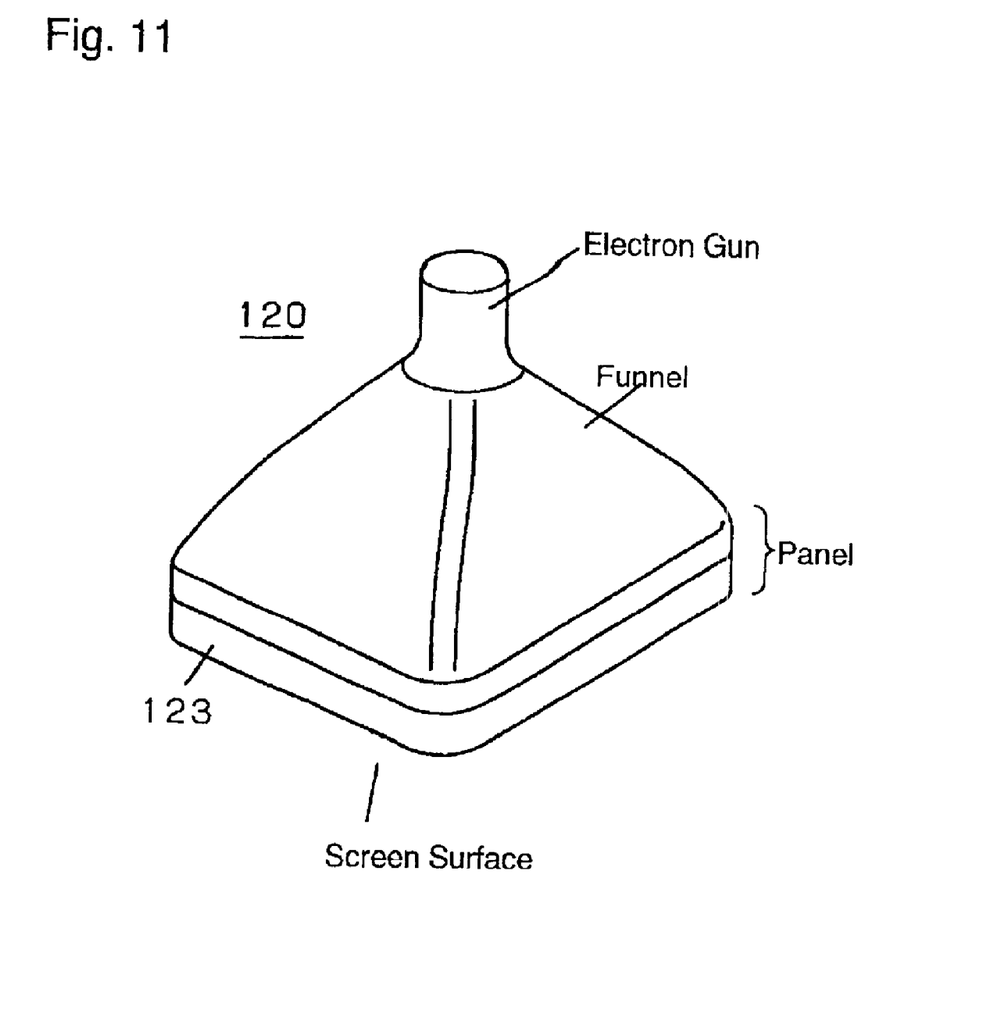
FIG. 11 is a perspective view of the CRT seen from a rear side for an explanation of the invention.

FIG. 1 shows a display panel holding device according to embodiment 1 of the present invention, and is a perspective outline view of a holding device 10 of a cathode-ray tube (CRT). FIG. 2 is an essential sectional view along a cut line 2—2 in FIG. 1. FIG. 11 is a perspective view of a CRT seen from the rear side for an explanation of the invention. A CRT 120 includes an electron gun, funnel, and panel A metal band 123 is wound around the panel. The funnel is shaped like a quadrangular pyramid. The panel has a screen surface disposed at the viewer side for displaying image by the electron gun.

As shown in FIG. 1 and FIG. 2, the CRT holding device 10 includes a rib section 20 corresponding to a shape of the funnel of the CRT 120, a rectangular frame 50 corresponding to an outline of the panel, and a support base 30 linked to at least one of the rib section 20 and the frame 60. The CRT holding device 10 holds the CRT 120 from the rear side in self-standing manner.

The rib section 20, frame 50, and support base 30 are unitarily formed with metal material. The metal material is one of magnesium alloy, aluminum alloy, and zinc alloy. They are formed by die-casting, injection molding, or a similar process.

The rib section 20 has a section having a shape like a gutter 21, which extends in plural directions. The leading end of the rib section 20 is unitarily linked to the end side of the frame 50. In FIG. 1, two ribs are formed each in a vertical and lateral directions, and intersections are formed at four positions.

The support base 30 has a section substantially shaped in a squared U-shape, and is unitarily linked to the two ribs 20 extending in the vertical direction and the frame 50.

In this configuration, the CRT holding device 10 holds the four sides around the panel of the CRT 120 from the rear side in self-standing manner.

In screw holes 51 at four respective corners of the frame 50, brackets provided at the four corners of the CRT 120 and the fame 50 are integrally tightened with screws (not shown).

In this CRT holding device, having a section formed like a gutter 21, the rib section 20 is more rigid than a flat plate, and thus can hold a 36-inch class large CRT in self-standing manner. The rib section has a smaller number of parts and a light weight. Further, if being made of metal members, the rib section has an improved recycling rate. Since the CRT is held in self-standing manner, the holding device can be manufactured by a conventional manufacturing process with using a front cabinet, and does not require a drastic modification of manufacturing equipment.

(Embodiment 2)

Figure 3:
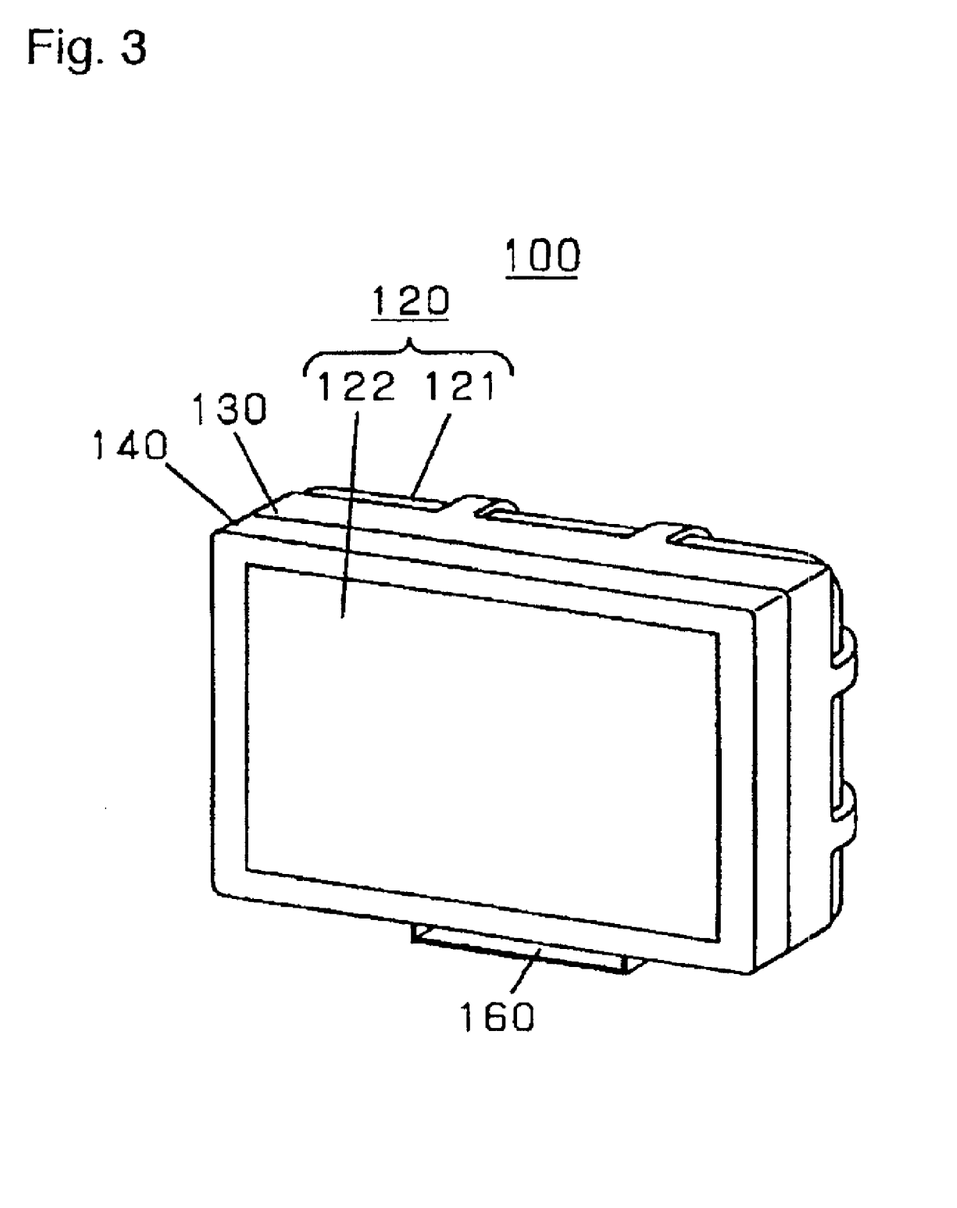
FIG. 3 is a perspective view of a television receiver according to embodiment 2 of the invention.
Figure 4:
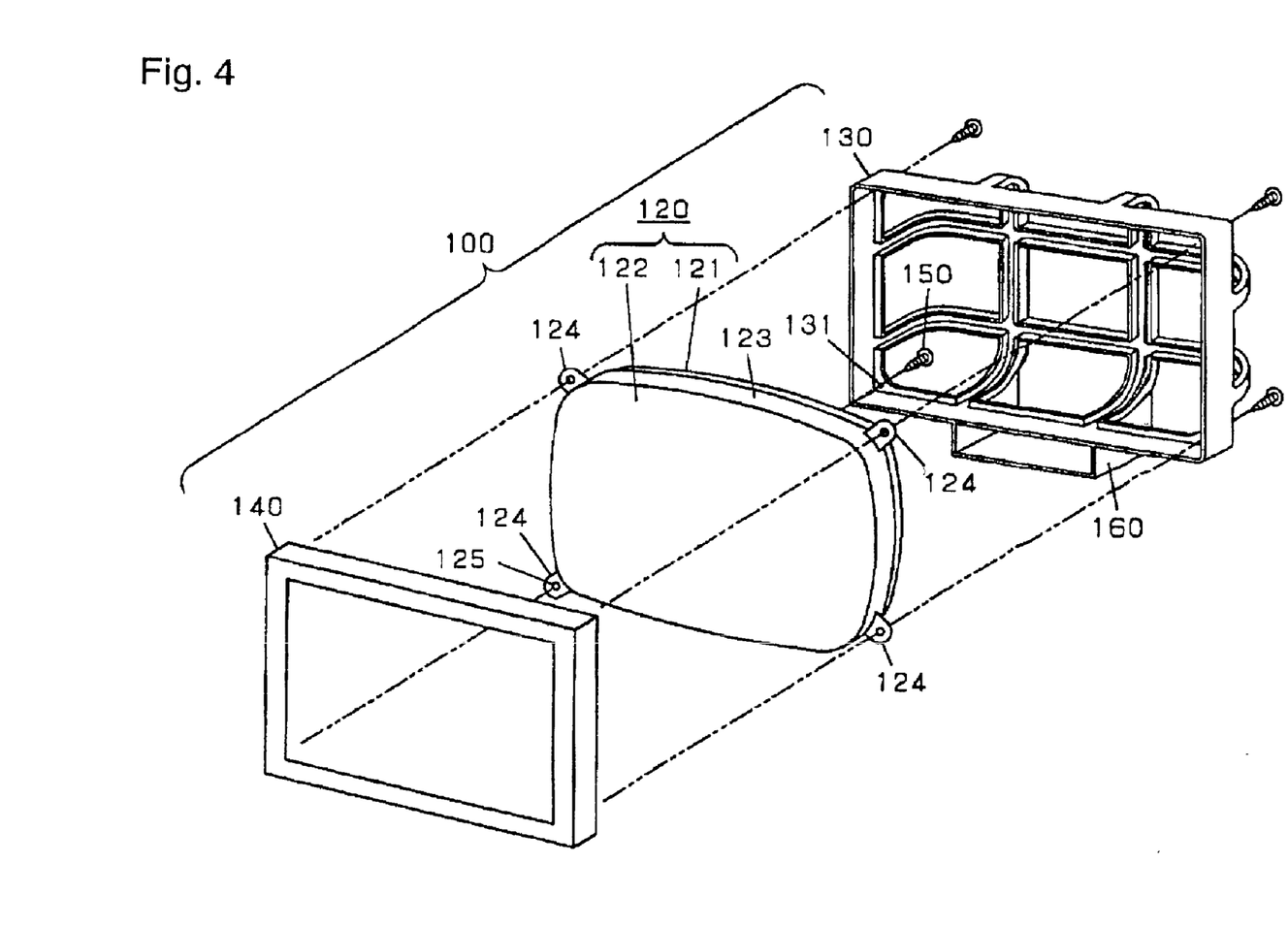
FIG. 4 is a perspective exploded view of the television receiver in FIG. 3.
Figure 5:
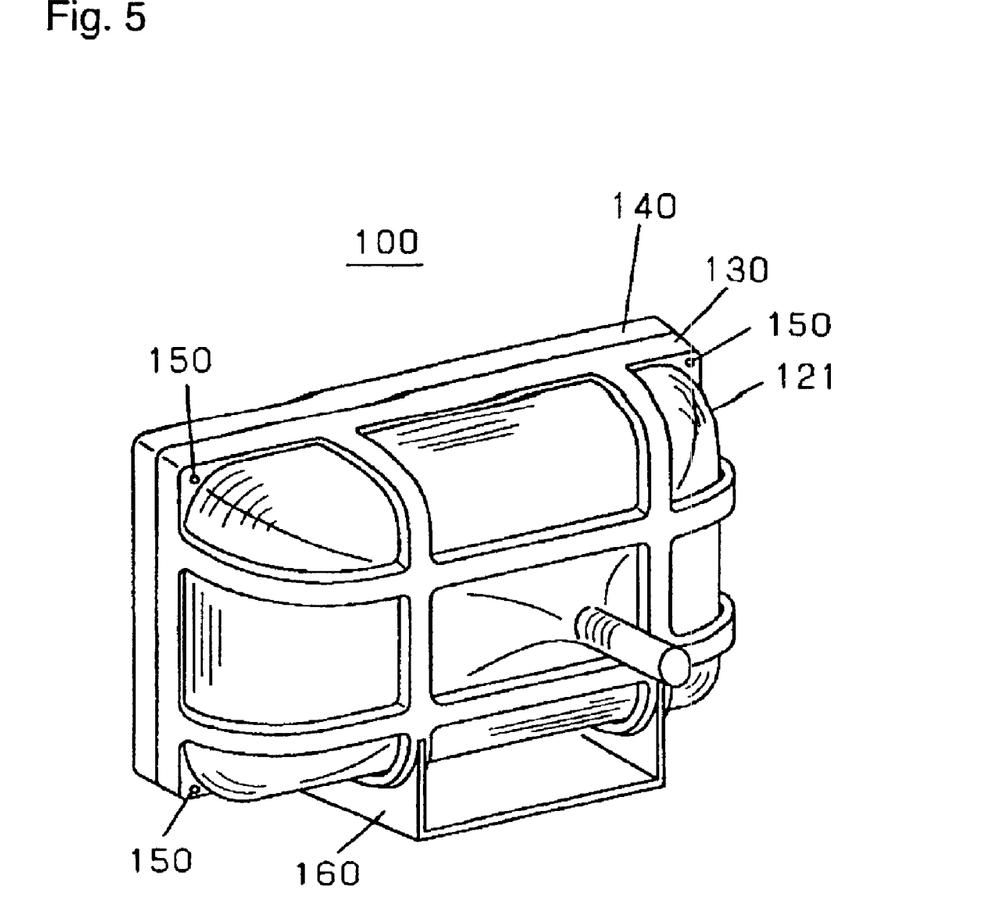
FIG. 5 is a perspective view of the television receiver in FIG. 3 seen from a rear side.

FIG. 3 is a perspective view of a television receiver, that is, a video appliance according to embodiment 2 of the present invention. FIG. 4 is a perspective exploded view of the television receiver in FIG. 3. FIG. 5 is a perspective view of the television receiver in FIG. 3 seen from the rear side.

As shown in FIG. 3 to FIG. 5, the television receiver 100 includes a cathode-ray tube (CRT) 120, a CRT holding device 130 for holding the CRT 120 from the rear side, and a front panel 140 attached to a screen surface 122 of the CRT 120. That is, the CRT holding device 130, which is the same as the CRT holding device explained in embodiment 1, holds the CRT 120 from the rear side in self-standing manner, and the front panel 140 is attached from the screen side of the CRT 120. The television receiver further includes a control circuit, a speaker device, a cover for covering the control circuit, and others as required (not shown). The CRT 120 has a metal band 123 wound around the outer periphery of the panel as shown in FIG. 4. Near the four corners of the CRT, brackets 124 are disposed by spot welding or other means. In the convex bracket 124, a penetration hole 125 for mounting is formed.

The CRT holding device 130, as being the same as the CRT holding device 10 explained in embodiment 1, a duplicate explanation is omitted. On the frame included in the CRT holding device 130, penetration holes 131 corresponding to the penetration holes 125 formed in the brackets 124 of the CRT are formed.

The front panel 140 has fixing bosses (not shown) corresponding to the penetration holes 125, 131. Therefore, the CRT 120 and front panel 140 are fixed to the CRT holding device 130 with the penetration holes 125, 131 and fixing screws 150 at the fixing bosses (not shown). The mounted (assembled) device is shown in FIG. 5.

In this configuration, in addition to a reduced number of parts and a reduced weight of the CRT holding device, the front panel attached to the screen side of the CRT and the cover for covering the control circuit have a reduced cost and weight. Further, the television receiver having an excellent appearance design and satisfying safety standards is provided.

(Embodiment 3)

Figure 6:
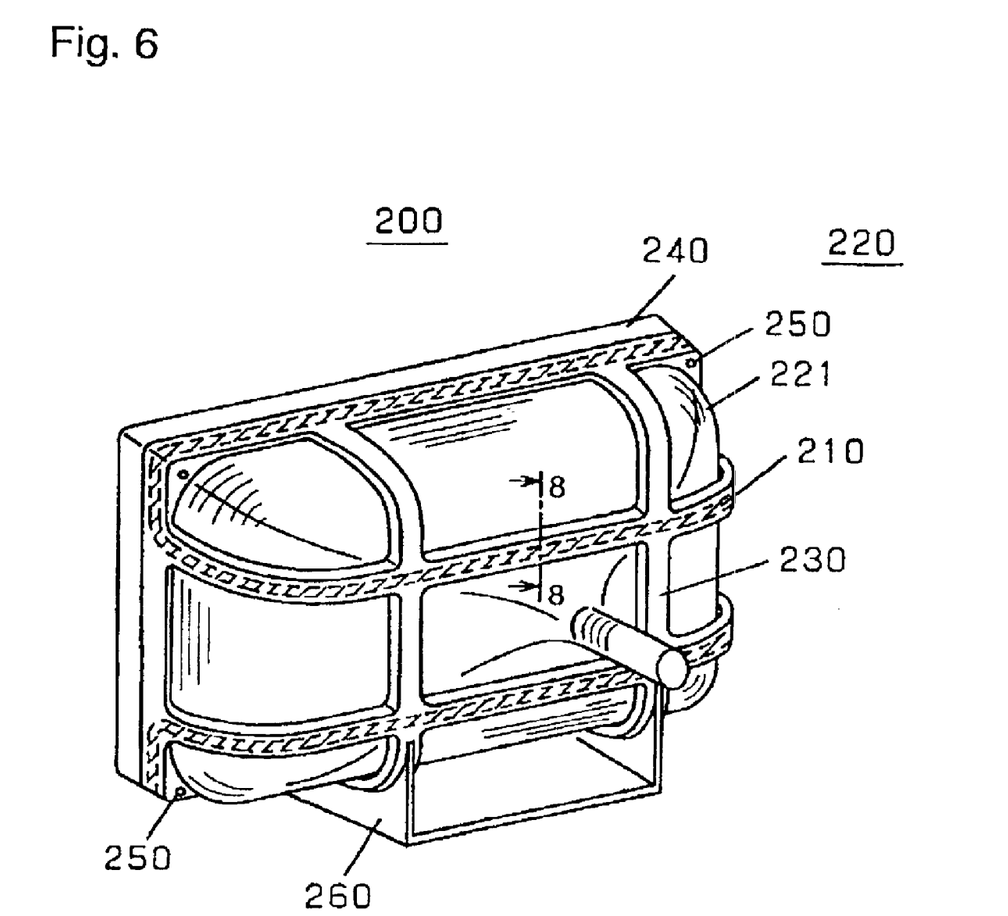
FIG. 6 is a perspective view of the television receiver according to embodiment 3 of the invention seen from a rear side.
Figure 7:
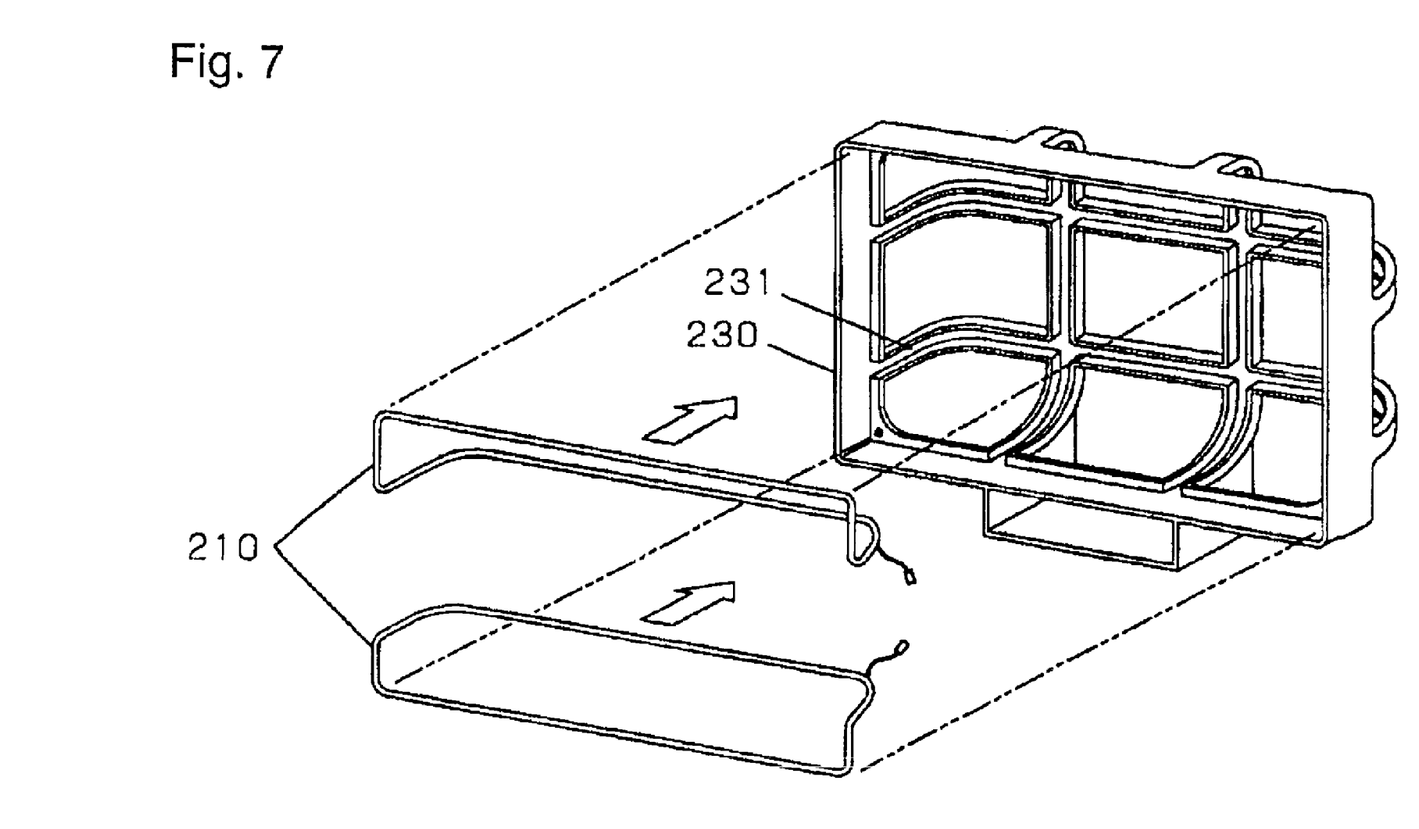
FIG. 7 is a perspective exploded view showing a process of mounting a degaussing coil on a CRT holding device included in the television receiver in FIG. 6.
Figure 8:
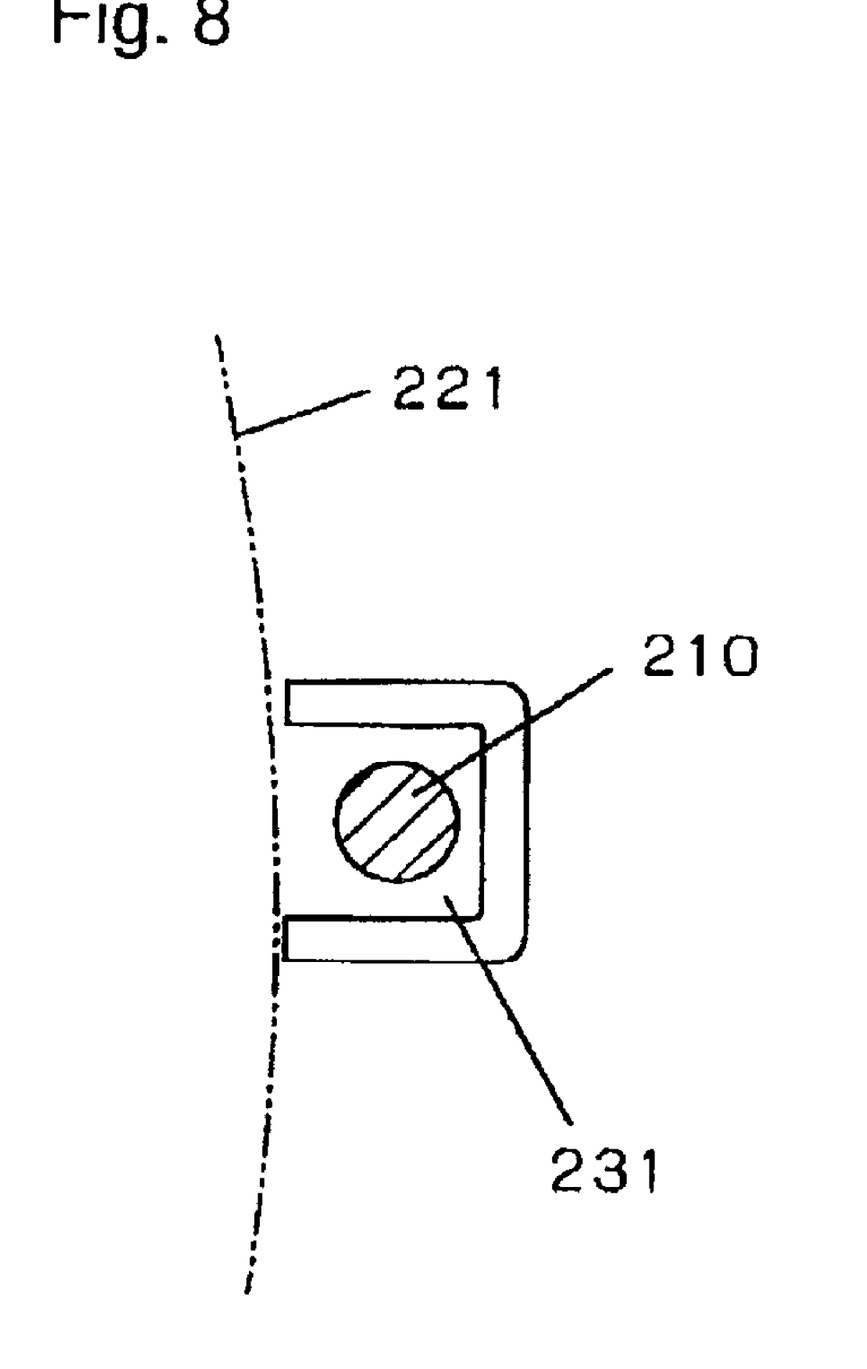
FIG. 8 is an essential sectional view along a cut line 8—8 in FIG. 6.

FIG. 6 is a perspective view of a television receiver seen from the rear side according to embodiment 3 of the invention. FIG. 7 is a perspective exploded view showing a process of mounting a degaussing coil in a groove of a CRT holding device included in the television receiver in FIG. 6. FIG. 8 is an essential sectional view along a cut line 8—8 in FIG. 6.

In FIG. 6 to FIG. 8, a television receiver 200 includes a cathode-ray tube (CRT) 220, a front panel 240 attached to the screen side of the CRT 220, a CRT holding device 230 for holding the CRT 220 from the rear side, and a degaussing coil 210 put in a groove 231 of the CRT holding device 230. That is, this receiver is substantially identical with the television receiver 100 explained in embodiment 2, except that the degaussing coil 210 is disposed in the groove 231 of the CRT holding device 230.

The degaussing coil 210 is made of a conductor wire turned spirally by a specified number of turns, and is formed in L-shape. The coil is put in the grooves 231 almost symmetrically in upper and lower positions of the back side of the CRT 220.

In this case, the television receiver further includes a control circuit, a speaker device, a cover for covering the control circuit, and others as required (not shown). In this configuration, the television receiver 200 does not require a member for mounting the degaussing coils, and the degaussing coils can be positioned with a deviation.

(Embodiment 4)

Figure 9:
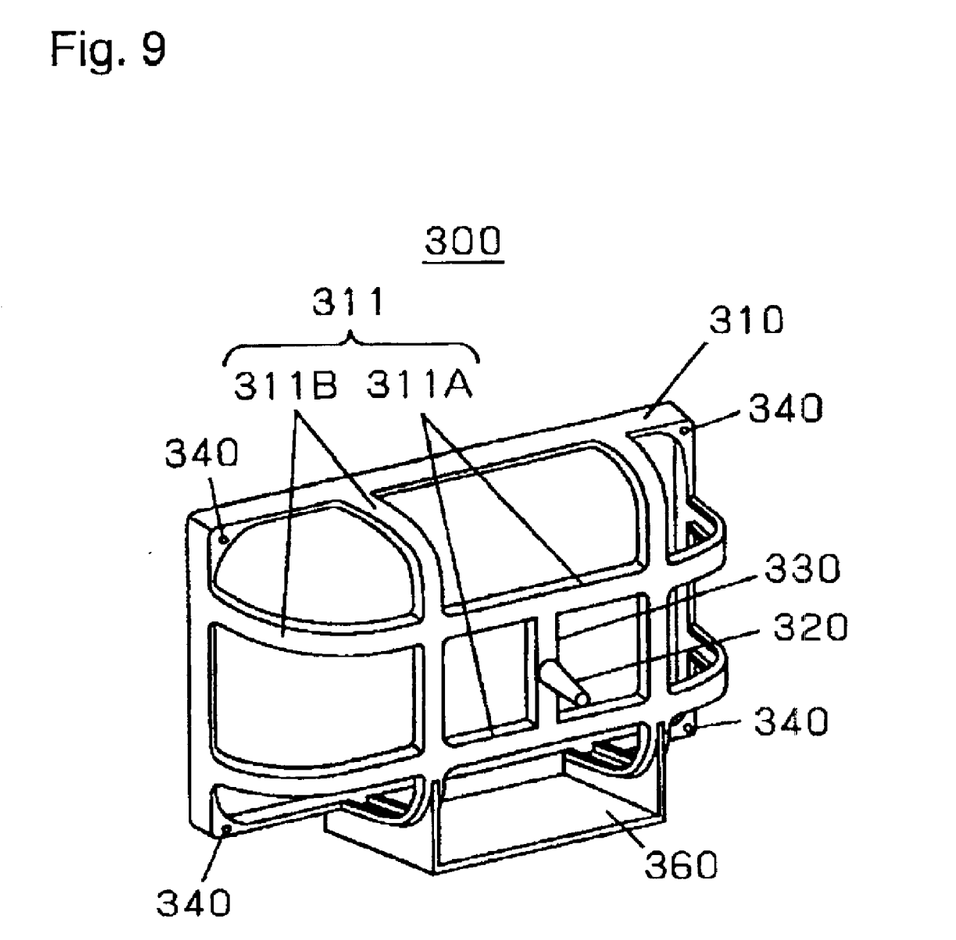
FIG. 9 is a perspective view of CRT holding device right after molding seen from the rear side, and showing a manufacturing method of the CRT holding device according to embodiment 4 of the invention.
Figure 10:
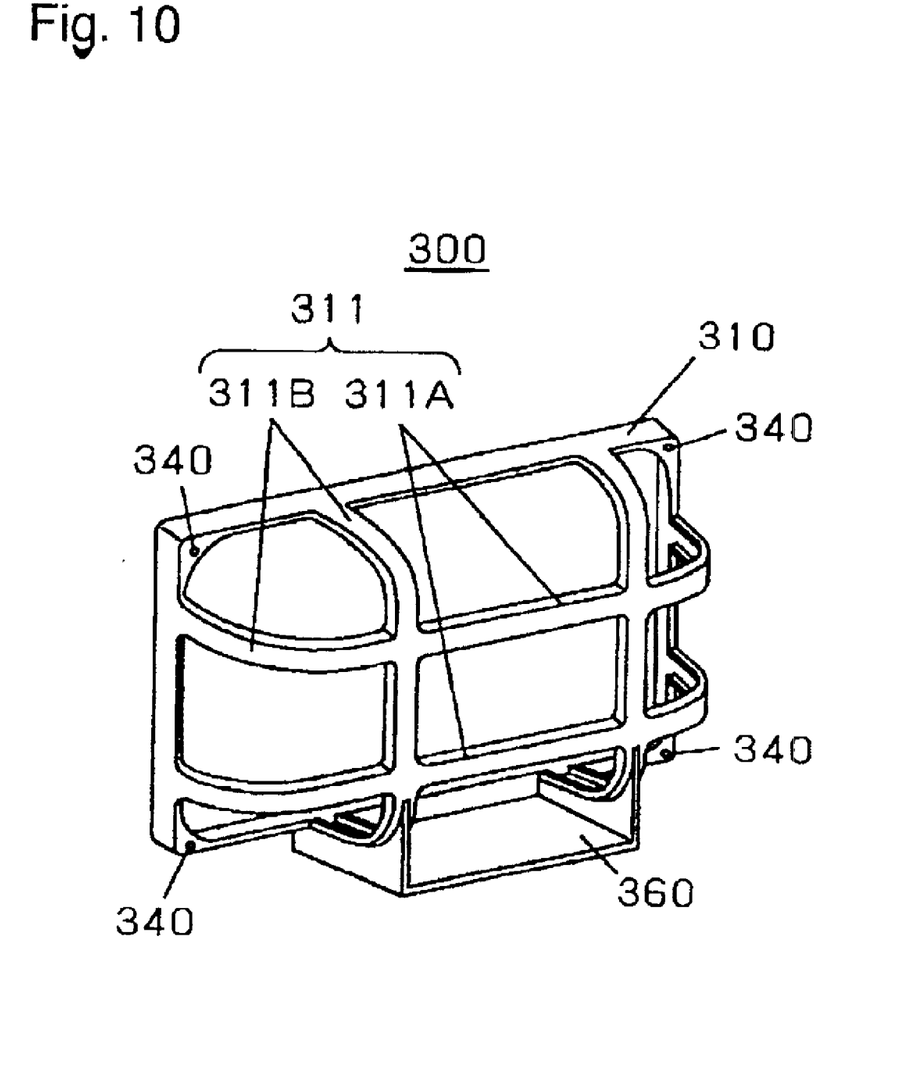
FIG. 10 is a perspective view of a completed product has a sprue section and runner section which are cut from the CRT holding device in FIG. 9 seen from the rear side.

FIG. 9 is a perspective view of a CRT holding device right after molding seen from the rear side and showing a method of manufacturing the CRT holding device according to embodiment 4 of the invention. FIG. 10 is a perspective view seen from the rear side of a completed product in which a sprue section and runner section are cut away from the CRT holding device right after molding.

The CRT holding device 300 shown in FIG. 9 and FIG. 10 is formed by an injection molding of resin member or metal member. The holding device 300, which is the same as the CRT holding device explained in embodiment 1, if includes a frame 310, a rib section 311, and a support base 360. The rib section 311 has a linear portion 311A and a curved portion 311B.

In FIG. 9, the CRT holding device right after molding includes, aside from the frame 310, rib section 311, and support base 360, a sprue section 320 in which the molding material is poured from a molding machine, and a runner section 330 for pouring the molding material into the frame 310 in divided portions and in good balance. While the injection molding, the linear portion 311 functions as the runner section. The runner section 330 is cut away from the holding device, and then the CRT holding device as shown in FIG. 10 is completed. The linear portion 311 is not cut away, but is left and used as a part of the rib section.

Thus, according to embodiment 4, the CRT holding device is characterized by the rib section having a shape corresponding to that of the funnel, the frame having a shape corresponding to that of the panel, and the support base for supporting the CRT, and they are unitarily formed. The device is further characterized by the runner section for pouring the molding material from the injection molding machine. In this configuration, the CRT holding device has a low material loss and reduced cost.

INDUSTRIAL APPLICABILITY

The invention relates to a holding device of a display panel, such as cathode-ray tube (CRT), and a video appliance incorporating the CRT.

The holding device of the invention holds a large and heavy 36-inch class CRT by the rib section in self-standing manner. As a result, it is not necessary to hold the CRT by the front panel attached to the screen side of the CRT or the cover for covering the control circuit, so that the front panel and cover can have a reduced weight and reduced cost. This holding device has an appearance designed freely, and satisfies safety standards.

Further, including the rib section formed by an injection molding, the front panel and cover with metal members such as steel plates, the video appliance can be safely recycled without a producing harmful matter, and thus, has an improved recycling rate. That hence contributes to conservation of environments.

Moreover, since including the support base unitarily formed with the rib section and holding the CRT in self-standing manner, the holding device in the television receiver can be manufactured by a conventional process, and does not require a drastic modification for a production facility.

Since having a section shaped in groove, the rib section is more rigid than a flat plate. As a result, the rib section can have a reduced wall thickness and a reduced cost.

Since accommodating the degaussing coil in the groove, the rib section does not need a mounting part for the degaussing coil, and has a reduced number of mounting steps.

Further, a part of the rib section functions as a runner section for pouring a molding material from a injection molding machine in good balance into the final product section, so that the frame may has a reduced material loss and cost.

What is claimed is:

1. A cathode-ray tube (CRT) holding device comprising:
   a rib section having a shape similar to a shape of a funnel of a CRT; and
   a frame formed unitarily with said rib section, said frame having a shape corresponding to a shape of a panel of the CRT, wherein said rib section and frame hold the CRT from a rear side of the CRT, and said rib section has a section shaped like a gutter having a groove.

2. A cathode-ray tube (CRT) holding device comprising:
   a rib section having a shape similar to a shape of a funnel of a CRT;
   a frame having a shape corresponding to a shape of a panel of the CRT; and
   a support base linked to at least one of said rib section and frame,
   wherein the CRT is held in self-standing manner from a rear side of the CRT.

3. The CRT holding device of claim 2, wherein said rib section, frame and support base are unitarily formed with metal material.

4. The CRT holding device of claim 3, wherein said metal material is one of magnesium alloy, aluminum alloy, and zinc alloy.

5. The CRT holding device of claim 2, wherein said rib section has a section shaped like a gutter having a groove.

6. A video appliance comprising:
   a rib section having a shape similar to a shape of a funnel of a cathode-ray tube (CRT); and
   a frame formed unitarily with said rib section, said frame having a shape corresponding to a shape of a panel of the CRT, wherein said rib section and frame hold the CRT from a rear side of the CRT, and said rib section has a section shaped like a gutter having a groove.

7. The video appliance of claim 6, further comprising a degaussing coil disposed in the groove of said rib section.

8. The video appliance of claim 6, further comprising front panel attached to a screen surface side of the CRT.

9. A video appliance comprising:
   a rib section having a shape similar to a shape of a funnel of a cathode-ray tube (CRT);
   a frame having a shape corresponding to a shape of a panel of the CRT; and
   a support base linked to at least one of said rib section and frame,
   wherein the CRT is held in self-standing manner from a rear side of the CRT, and said rib section has a section shaped like a gutter having a groove.

10. The video appliance of claim 9, further comprising degaussing coil disposed in the groove of said rib section.

11. The video appliance of claim 9, further comprising front panel attached to a screen surface side of the CRT.

12. A cathode-ray tube (CRT) holding device comprising:
    a rib section for holding a CRT from a rear side of the CRT, said rib section having a shape similar to a shape of a funnel of the CRT; and
    a runner section for pouring injection material from an injection molding machine, said runner section being provided as a part of said rib section.

13. A cathode-ray tube (CRT) holding device comprising:
    a rib section having a shape corresponding to a shape of a funnel of a CRT;
    a frame formed unitarily with said rib section, said frame having a shape corresponding to a shape of a panel of the CRT; and a runner section for pouring injection material from an injection molding machine, said runner section being provided as a part of the rib section.

14. A cathode-ray tube (CRT) holding device comprising:

a rib section having a shape corresponding to a shape of a funnel of a CRT;

a frame having a shape corresponding to a shape of a panel of the CRT;

a support base for holding the CRT in self-standing manner; and a runner section for pouring injection material from an injection molding machine, said runner section being provided as a part of said rib section, wherein said rib section, frame, and support base are formed unitarily.

15. A display panel holding device comprising:

a rib section having a shape corresponding to a shape of a rear portion of a display panel;

a frame having a shape corresponding to a shape of a peripheral portion of the display panel; and a support base linked to at least one of said rib section and frame, wherein the display panel is held in self-standing manner from a rear side of the display panel.

* * * * *